US012658024B2

(12) United States Patent
Nalukurthy et al.

(10) Patent No.: US 12,658,024 B2
(45) Date of Patent: *Jun. 16, 2026

(54) WALK TEST FOR FIRE ALARM SYSTEMS USING A MOBILE DEVICE

(71) Applicant: Honeywell International Inc., Charlotte, NC (US)

(72) Inventors: Rajesh Babu Nalukurthy, Bangalore (IN); Mahadevan Somasundram Balakrishnan, Chennai (IN); Siva Sankar Mathuraju, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/781,396

(22) Filed: Jul. 23, 2024

(65) Prior Publication Data

US 2024/0378990 A1 Nov. 14, 2024

Related U.S. Application Data

(63) Continuation of application No. 18/119,880, filed on Mar. 10, 2023, now Pat. No. 12,046,125, which is a continuation of application No. 17/308,136, filed on May 5, 2021, now Pat. No. 11,610,471.

(60) Provisional application No. 63/020,341, filed on May 5, 2020.

(51) Int. Cl.
*G08B 29/14* (2006.01)
*G08B 29/04* (2006.01)

(52) U.S. Cl.
CPC ......... *G08B 29/145* (2013.01); *G08B 29/043* (2013.01)

(58) Field of Classification Search
CPC .... G08B 29/043; G08B 29/145; G08B 25/14; G08B 29/12; G06F 3/0482; G06F 3/04817
See application file for complete search history.

(56) References Cited

U.S. PATENT DOCUMENTS

| | | | |
|---|---|---|---|
| 9,552,720 | B2 | 1/2017 | Moffa |
| 9,905,115 | B2 | 2/2018 | Venkatesh et al. |
| 2005/0280527 | A1 | 12/2005 | Farley |

(Continued)

OTHER PUBLICATIONS

European Extended Search Report for related European Application No. 21172139.4, mailed Oct. 5, 2021 (9 pgs).

*Primary Examiner* — Mirza F Alam
(74) *Attorney, Agent, or Firm* — Brooks, Cameron & Huebsch, PLLC

(57) ABSTRACT

Methods and systems for performing a walk test for fire alarm systems using a mobile device are described herein. One fire alarm system, includes a system control panel fixedly positioned within a building for controlling a plurality of fire alarm system devices connected to the panel and positioned within the building, a mobile device wirelessly connected to the control panel, and a fire alarm system control application on the mobile device, wherein the fire alarm control system application gains access to the control panel and, therethrough, the plurality of fire alarm system devices and wherein the fire alarm control system application issues a command to a particular fire alarm system device of the plurality of fire alarm system devices to perform a particular test or maintenance function and the control panel relays the command to the particular fire alarm system device.

20 Claims, 5 Drawing Sheets

(56) References Cited

U.S. PATENT DOCUMENTS

| | | | | |
|---|---|---|---|---|
| 2008/0084291 | A1* | 4/2008 | Campion | G08B 29/145 340/514 |
| 2015/0348399 | A1* | 12/2015 | Cree | G08B 29/145 715/740 |
| 2017/0092113 | A1* | 3/2017 | Moffa | G08B 29/043 |
| 2017/0287319 | A1* | 10/2017 | Moffa | G08B 29/145 |
| 2018/0374338 | A1* | 12/2018 | Bonfiglio | H04B 7/26 |
| 2019/0266884 | A1 | 8/2019 | Popkowski et al. | |

* cited by examiner

WALK TEST FOR FIRE ALARM SYSTEMS USING A MOBILE DEVICE

PRIORITY INFORMATION

This Application is a Continuation of U.S. application Ser. No. 18/119,880, filed Mar. 10, 2023, which published as U.S. Publication No. 2023-0215268 A1 on Jul. 6, 2023 and will issue as U.S. Pat. No. 12,046,125 on Jul. 23, 2024, which claims priority to U.S. application Ser. No. 17/308,136, filed May 5, 2021, which published as U.S. Publication No. 2021-0350693 A1 on Nov. 11, 2021 and has issued as U.S. Pat. No. 11,610,471 on Mar. 21, 2023, which claims priority to U.S. Provisional Application No. 63/020,341, filed May 5, 2020, the contents of which are incorporated herein by reference.

TECHNICAL FIELD

The present disclosure relates to methods and systems for performing a walk test for fire alarm systems using a mobile device.

BACKGROUND

In the current state of art for doing a walk test at a fire alarm system location, there is generally a need for two technicians, one at the location of the fire system control panel and one at the fire alarm system device location, both communicating with each other on a radio. In such implementations, the technician moving toward the fire alarm system device to be tested should know the exact location of the fire alarm system device on a floor of a building and the technician at the panel should know the exact fire alarm system device address so the technician can key that address in on the panel key pad.

The above process can be error prone due to possible communication errors between the technicians and puts a site at risk during these procedures as the fire alarm system is not in operation during this walk testing procedure. As such, there is a need for a compulsory fire watch by other technicians or building occupants during this time.

The other major challenge with the current process is that the technician does the walk test progression based on the device address order in the control panel, which may be wholly different than the order in which the devices are physically positioned, sometimes making the technician crisscross the building inefficiently during the walk testing.

Also, currently all commands for the fire alarm system devices are commands initiated by the control panel. Oftentimes, this requires the technician to be physically present and the control panel rather than at the fire alarm system device location.

DETAILED DESCRIPTION

Figure 1:
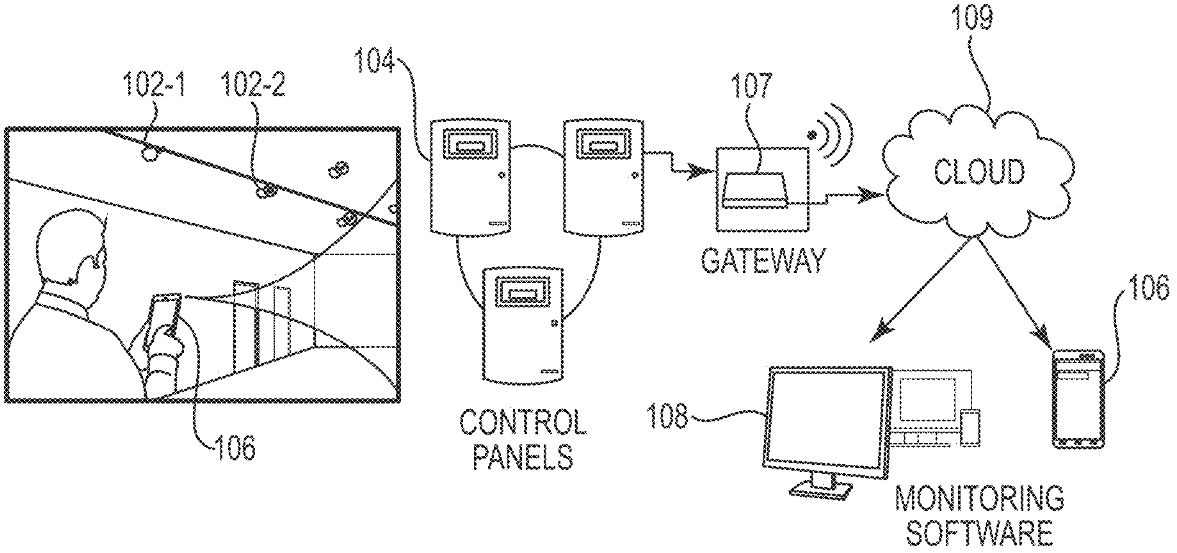
FIG. 1 illustrates a system for performing a walk test for fire alarm systems using a mobile device according to an embodiment of the present disclosure.

As discussed above, methods and systems for performing a walk test for fire alarm systems using a mobile device are described herein. One fire alarm system, includes a system control panel fixedly positioned within a building for controlling a plurality of fire alarm system devices connected to the panel and positioned within the building, a mobile device wirelessly connected to the control panel, and a fire alarm system control application on the mobile device, wherein the fire alarm control system application gains access to the control panel and, therethrough, the plurality of fire alarm system devices and wherein the fire alarm control system application issues a command to a particular fire alarm system device of the plurality of fire alarm system devices to perform a particular test or maintenance function and the control panel relays the command to the particular fire alarm system device.

As this command functionality is provided to the mobile device, a technician can take initiate a walk test mode, initiate physical identification signals, search the database for information about particular fire alarm system devices and other functions while travelling to or at the location of a particular fire alarm system device. The system can also allow the fire alarm system devices to be individually placed in walk test mode allowing the technician to test the fire alarm system devices in the order that they are physically located or based on accessibility (e.g., fire alarm system devices that are within reach without a ladder can be done together).

In the following detailed description, reference is made to the accompanying drawings that form a part hereof. The drawings show, by way of illustration, how one or more embodiments of the disclosure may be practiced.

These embodiments are described in sufficient detail to enable those of ordinary skill in the art to practice one or more embodiments of this disclosure. It is to be understood that other embodiments may be utilized and that process, computerized, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced as 206 in FIG. 2.

As used herein, "a" or "a number of" something can refer to one or more such things. For example, "a number of devices" can refer to one or more devices. As used herein, "a plurality of" means two or more things.

FIG. 1 illustrates a system for performing a walk test for fire alarm systems using a mobile device according to an embodiment of the present disclosure. In FIG. 1, the system has monitoring software (fire alarm system control application) on a remote computing device 108 and a mobile device 106, communicating via a wide area network (e.g., cloud) 109, with a number of control panels 104, and a number of fire alarm system devices 102-1, 102-2.

A gateway 107 is installed at the building being monitored by the fire alarm system to facilitate the communication between the monitoring software on remote devices 106 and 108 and the control panels 104.

The one or more control panels 104 include a database therein that contains data about each fire alarm system device. Any suitable data can be contained therein. Examples of suitable data include: device address, device label, location information, make, model, service history, commission date, maintenance schedule items list, suggested maintenance timeframe information, historical service interval time periods, zone information, group information, and loop information.

As used herein the term zone means a number of fire alarm system devices that are located in a particular area of the building (e.g., a zone can be all devices in a conference room or the west wing of a floor of a building). A building may have a plurality of zones.

As used herein the term group means a number of fire alarm system devices that have a common characteristic and are grouped together by the technician (e.g., a group can be all devices of a particular make/model, devices being of a certain age, devices having a particular type of accessibility or requiring special equipment, or devices having a particular functionality in common). A building may have a plurality of groups.

As used herein the term loop means a number of fire alarm system devices that are part of a sub-system of the overall system of a building. A building may have a plurality of loops each comprised of a different set of fire alarm system devices.

Location information can be any information that can be used to identify the location of a particular fire alarm system device. Examples of location information include: what floor a fire alarm system device is located on, a particular area of the building (e.g., west wing), or a particular room (e.g., conference room).

Service history information can be any information that can be useful to a technician regarding the service history of a particular fire alarm system device. Examples of service history information include: commission date, date of last service, type of service performed, technician notes on the condition of the fire alarm system device at the time of the last service, and emerging problems with the fire alarm system device.

As used herein a specific condition can include membership in a group of devices having a common maintenance condition, as discussed herein. For example, it may be advantageous to work on devices of the same group at the same time or to confirm that devices that should be part of a group are all members of that group. It may also be helpful to work on all devices having a common maintenance condition at the same time (e.g., device cleaning may require the same tools and materials, so the technician can quickly move from one device to the next if they all require that same service). This may be beneficial, for example, to identify and group all devices that were commissioned on a certain date and may need replacement.

A specific location can be a location in a group of devices at a particular physical location, within a particular floor, or within a particular loop. In some embodiments, the search utility can identify fire alarm system devices that have a common specific location and/or have a common specific condition. This may be beneficial, for example, in identifying whether all devices in the conference room are members of the group labeled "Conf Room".

The above system arrangement allows the system to provide several unique functionalities. For example, the fire alarm system devices can receive commands directly from the mobile device, via the control panel. This is different from prior art devices wherein a mobile device sends a command to the control panel and then the control panel responds by sending its own command to the fire alarm system device.

Further, systems of the present disclosure allow the mobile device to put individual fire alarm system devices into walk test mode rather than prior art systems where all devices connected to a system control panel are placed in walk test mode when a walk test is being conducted and wherein these devices are placed in walk test mode at the control panel.

Additionally, the systems of the present disclosure allow for the walk testing of the fire alarm system devices to be accomplished in an order decided by the technician (e.g., by individually placing them in walk test mode by the technician using the mobile device at a location of a particular fire alarm system device that the technician wants to test) or based on groups, zones, loops, buildings, networks, or other groupings, as such are defined herein.

Such grouping functionalities can be accomplished, for example, by the fire system control application having processor executable instruction to provide the ability to search for a specific device or groupings of devices in the building through a process such as the following.

The technician comes to building, connects the technician's mobile device to a system control panel. Once the technician's mobile device is connected to the control panel of the fire alarm system of the building, the technician opens a mobile monitoring application on the mobile device and gets access to the system control panel.

The technician can, then, command the one or more particular fire alarm system devices to perform a function, such as to activate a physical identification signal, from an indicator located on the fire alarm system device, in a specific state. Any suitable state can be utilized. Some suitable states include: a certain color of light, a pattern of light pulses, a combination of alternating colors, etc.

The technician then walks around the floor, looking at the indicators (e.g., a visual indicator such as a particular colored light or pattern of light pulses) on the fire alarm system devices and is quickly able to identify and access to the one or more fire alarm system devices indicating the specific condition by locating the one or more fire alarm system devices with an indicator exhibiting the specific state. Such a feature can save a technician considerable time and allow the task to be accomplished by one technician.

Another unique functionality provided by such a system is the ability to securely search for a group of devices that are potentially due for maintenance or replacement in the near future. This can be accomplished, for instance, by reviewing the service history of each particular fire alarm system device identified, by reviewing device maintenance levels, and/or consulting general service maintenance guidelines for a particular fire alarm system device model to identify suggested maintenance timeframe information, for example.

For instance, smoke detectors can go into different maintenance levels like: low chamber value, maintenance alert, and maintenance urgent and such maintenance level information can be used to identify a fire alarm system device in need of a particular type of service. In such an embodiment, fire alarm system devices exhibiting such levels can be grouped and presented to the technician (e.g., via the search utility of the mobile monitoring application), via the mobile device, such that the technician can perform appropriate service to all fire alarm system devices of a particular level.

In this example, in the list the technician receives having a common specific condition, the technician realizes that there are Y number of devices in first floor, Z number of devices in second floor, and so on. The technician then moves to the first floor and commands all of the Y number of fire alarm system devices on the list that are on the first floor, using the technician's mobile device, to signal the technician by initiating a particular physical identification signal on the fire alarm system devices. The technician can then walk around the floor and identify the fire alarm system devices that responded to this command based on them exhibiting the physical identification signal.

The technician, then, performs the required tests and/or maintenance/replacement, and moves to the next device that is providing the specific indication (physical identification signal). The system can then update that the fire alarm system device is returning to an in-service state and informs the technician on the mobile device.

In this manner, without much understanding about the location of the fire alarm system devices in the building, the technician quickly completes this maintenance work and can move on to the next customer site.

It should be noted that each fire alarm system device can be placed in-service and out-of-service (i.e., walk test mode is out-of-service) independently by the technician via the monitoring application on the mobile device. This allows for less devices being out-of-service during the maintenance process which reduces risk and liability of a fire starting during the maintenance period when devices are out-of-service.

Figure 2:
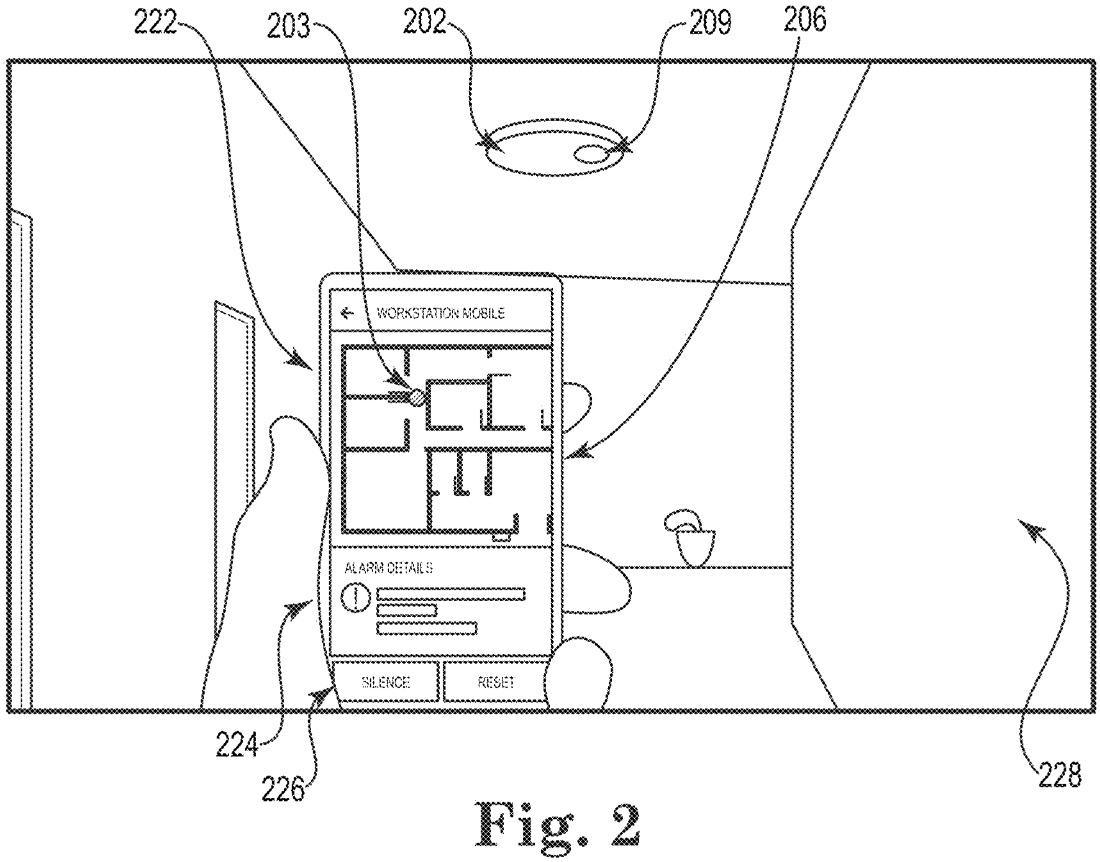
FIG. 2 illustrates a mobile device for use in a system for performing a walk test for fire alarm systems using a mobile device according to an embodiment of the present disclosure.

FIG. 2 illustrates a mobile device for use in a system for performing a walk test for fire alarm systems using a mobile device according to an embodiment of the present disclosure. As discussed above, the mobile device provides substantial unique functions to the fire alarm system in embodiments of the present disclosure.

FIG. 2 illustrates a graphical user interface (GUI) of a monitoring application on a mobile device. In this illustration, the mobile device 206 includes a number of functional buttons 226, some information 224 about the particular fire alarm system device the technician is being directed to, a schematic map 222 depicting the actual layout of the part of building 228 the technician is traversing, including the location of a fire alarm system device 202 depicted on the map at 203. The fire alarm system device 202 also includes an indicator 209 for generating a physical identification signal to help the technician identify the correct device needing maintenance.

The information provided at 224 can be any information helpful to the technician. For example, suitable information can be: device identification number, model identifier, brand, maintenance history, or upcoming maintenance from a maintenance schedule. The information can also include: group, loop, or zone name and/or identifiers of other group, loop, or zone fire alarm system devices.

As discussed above, the interface can have a number of functional buttons 226 and can be configured to provide any function described herein that is attributed to the mobile device. For example, the two buttons shown in FIG. 2 provide a mechanism to silence a sounder, if a signal has been sent to sound the sounder as a guide to the technician or as part of a test procedure carried out by the technician. The other button is used to reset the status of the particular fire alarm system device on which maintenance is being performed, for example, once the testing/maintenance procedures have been accomplished.

Figure 3:
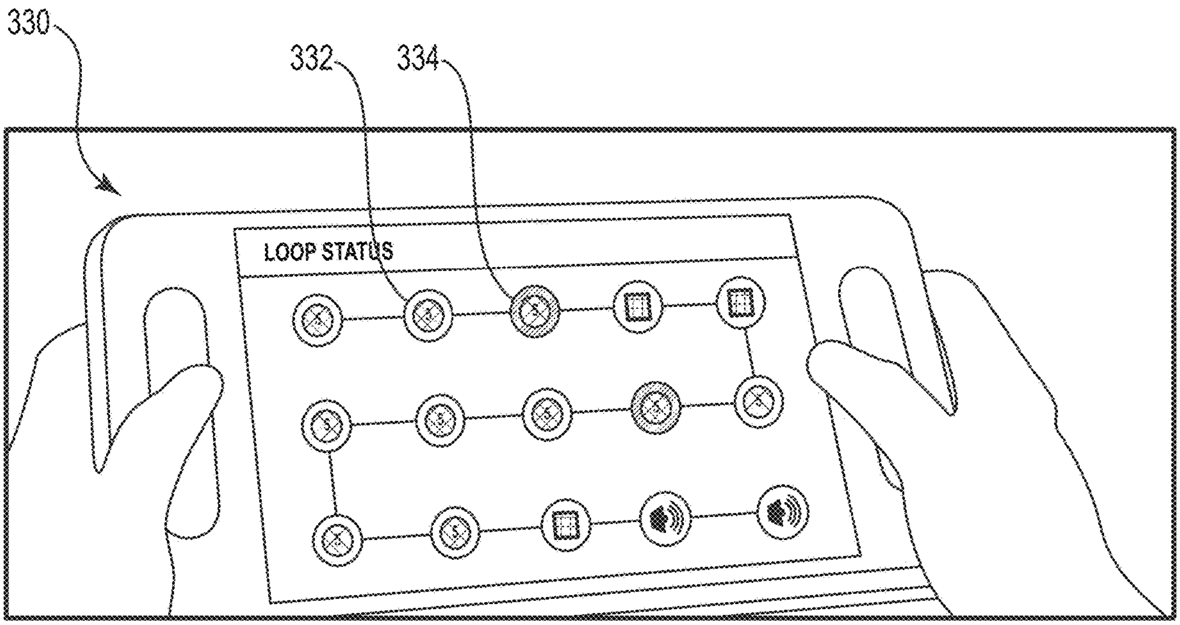
FIG. 3 illustrates another type of mobile device for use in a system for performing a walk test for fire alarm systems using a mobile device according to an embodiment of the present disclosure.

FIG. 3 illustrates another type of mobile device for use in a system for performing a walk test for fire alarm systems using a mobile device according to an embodiment of the present disclosure. In this example, a loop of fire alarm system devices is shown.

Each different icon presented on the GUI of the mobile device 330 represents a different fire alarm system device in the loop, which as indicated by the illustration is an interconnected group of devices. The different patterns on the icons represent different types of fire alarm system devices, such as smoke detectors, fire detectors, carbon dioxide detectors, audible alarm devices, user interaction devices such as pull switches, etc.

Further, some devices are indicated as not needing to be addressed for maintenance at 332 (e.g., outer ring of icon is not shaded) and others are indicated as needing to be examined for service issues at 334 (e.g., outer ring of icon shaded). In this manner, the technician can easily identify which devices are in a particular loop, which need attention and which don't, the type of devices in the loop, and their arrangement in the loop. This can be significantly helpful to a technician attempting to handle many maintenance or troubleshooting tasks with respect to the system.

Another functionality that can be provided by the system described in FIG. 1 provides the ability to give/update the fire alarm system device labels at the location of the particular fire alarm system device using his mobile device. One of the major challenges technicians face during commissioning and maintenance time is to ensure the right labels are given to each of the fire alarm system devices at the right locations. Without the solution of the present disclosure, two technicians are needed, one at the fire alarm system device location and the other at the panel location. In such a process, the first technician would activate the fire alarm system device and the second technician would be at the panel location to ensure a correct label is showing up on the panel. This process is complex and time consuming and prone to errors in communication between the technicians.

With this unique ability in the monitoring application, a single technician can also now command all the fire alarm system devices with a specific label to be activated at the same time. For example, the technician might search for all devices with label Conf Room ABC to respond, if the technician observes that a specific device is not responding in the conf room, the technician realizes that and fixes it, as the technician is located in the conference room with their mobile device rather than at the control panel which is not in the conference room and may, likely, not even be on the same floor as the conference room.

For example, one sample procedure for accomplishing this is as follows. The technician commands all of the fire alarm system devices in a particular area to provide a specific physical identification signal. The technician approaches a fire alarm system device that is not providing the specific physical identification signal, fixes the issue, and activates the fixed fire alarm system device.

The activation event appears on the GUI of the mobile device. The technician sees the label that the fire alarm system device has been assigned and will have an option to change the label at that time. As the reader can understand, such a process saves huge commissioning time, effort, and cost, among other benefits. The customized device labeling is discussed below in more detail with respect to FIG. 4.

Figure 4:
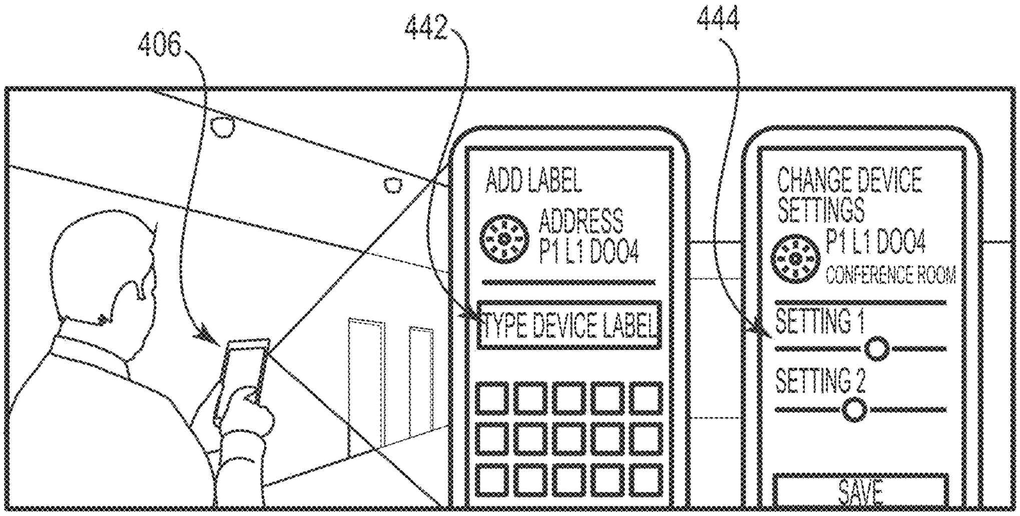
FIG. 4 illustrates user interface screens on a mobile device for use in a system for performing a walk test for fire alarm systems using a mobile device according to an embodiment of the present disclosure.

FIG. 4 illustrates user interface screens on a mobile device for use in a system for performing a walk test for fire alarm systems using a mobile device according to an embodiment of the present disclosure. As discussed herein, in some embodiments, the mobile monitoring application on mobile device 406 can have a functionality to allow the technician to customize the identification information of a particular fire alarm system device.

For example, as illustrated in FIG. 4, the functionality can allow for the customization of a device label at 442. For instance, a suitable label may be "conference room" as shown in the right depiction of the GUI in FIG. 4, wherein it provides the fire alarm system device address: P1L1D004 and the customized label: CONFERENCE ROOM.

The GUI can also provide functionality to change one or more fire alarm system device settings. For example, FIG. 4 at 444 illustrates two setting types being adjustable. Any suitable setting may be adjusted. For instance, a first alarm threshold and a second alarm threshold may be adjusted based, for example, on historical data regarding alarm triggering events for this particular fire alarm system device.

It should be noted that, since the changes discussed above are done from the mobile device to the database in the control panel, the changes can register on the system in near real time. This can be beneficial, for example, where multiple technicians may be moving around a building doing maintenance, as the system is up to date whenever they look at information about a particular fire alarm system device.

Figure 5:
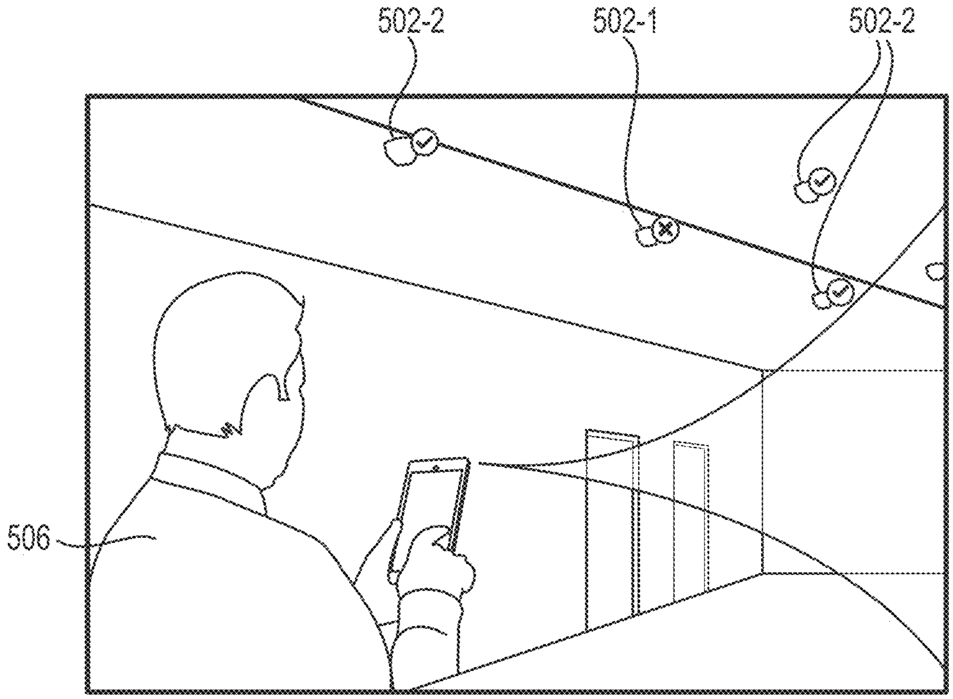
FIG. 5 illustrates multiple fire alarm system devices for use in performing a walk test for fire alarm systems using a mobile device according to an embodiment of the present disclosure.

FIG. 5 illustrates multiple fire alarm system devices for use in performing a walk test for fire alarm systems using a mobile device according to an embodiment of the present disclosure. As discussed above, in some embodiments, the fire alarm system devices can have different physical identification signals which help a technician identify those needing maintenance. In some embodiments, devices can even have different physical identification signals, for example, to identify different types of service needed or to indicate different thing, such as acknowledgement of receipt of a command to perform a function and completion of performance of a commanded function. For example, if the embodiment of FIG. 5 had such a functionality, the fire alarm system device 502-1 may need a first type of maintenance performed on it, while devices 502-2 may need a different type of maintenance.

Further, in some embodiments, physical identification signals can be used to identify members of a specific group, loop, or zone. This can be helpful, for example, in determining if a device is part of the wrong group, loop, or zone. For example, in FIG. 5, device 502-1 has a different indicator than devices 502-2. In such an embodiment, if all devices shown were to be members of Zone 1 (indicated by the check mark in FIG. 5), this would indicate to the technician that device 502-1 is a member of a different zone and should be reassigned to Zone 1.

As can be understood by the reader, the embodiments of the present disclosure can provide a number of benefits. For example, embodiments can provide the: ability to carry out a walk test process on a fire alarm system using a mobile device at an individual device level without the need to physically go to the panel; ability to selectively place a chosen device IN walk test mode or OUT of walk test mode using a mobile phone; ability to enable an advanced walk test process for each technician allowing multiple users to perform individual device level walk test at the same time using their mobile devices; ability for devices that are put into walk test mode to respond back to the technician in a different physical identification signal state so it is easy to recognize; ability for asking the devices that are to be tested based on the maintenance service history to be going in to walk test mode and respond to the technician using the physical identification signal state of the devices; ability for enabling the advanced walk test based on the accessibility of the fire alarm system devices or preference of the technician rather than the identification number of the fire alarm system device, as is the case in the current state of art; ability to do a visual test by enabling the physical identification signal state of the device, for example, to ensure an audit trial gets maintained in the system locally as well on the connected software; ability to provide the above functions at a zone, loop, or panel level, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion and not a restrictive one. Combination of the above embodiments, and other embodiments not specifically described herein, will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A fire alarm system monitoring mobile device, comprising:

a fire alarm system control application resident on the mobile device, wherein the fire alarm system control application allows for selection of a loop of fire alarm system devices to activate a test mode of the loop of fire alarm system devices, wherein the loop is a subsystem of interconnected fire alarm system devices; and a graphical user interface of the fire alarm system control application on the mobile device, wherein the graphical user interface includes:

a number of icons, each icon representing one of the fire alarm system devices within the selected loop;

a number of functional buttons to initiate a response on each of the selected fire alarm system devices of the loop; and information about a particular fire alarm system device among the loop of fire alarm system devices that a technician is being directed to as part of a test procedure carried out by the technician.

2. The fire alarm system monitoring mobile device of claim 1, wherein the number of functional buttons provide a mechanism to silence a sounder when a signal has been sent to sound the sounder as a guide to the technician as part of the test procedure carried out by the technician.

3. The fire alarm system monitoring mobile device of claim 1, wherein the number of functional buttons provide a mechanism to reset a status of the particular fire alarm device on which maintenance is being performed by the technician.

4. The fire alarm system monitoring mobile device of claim 1, wherein the information includes a device identification number, model identifier, brand, maintenance history, or upcoming maintenance from a maintenance schedule.

5. The fire alarm system monitoring mobile device of claim 1, wherein the information includes identifying information to identify fire alarm system device members of a specific loop.

6. The fire alarm system monitoring mobile device of claim 1, wherein each icon of the number of icons includes a different pattern such that the different patterns represent different types of fire alarm system devices.

7. The fire alarm system monitoring mobile device of claim 6, wherein the different types of fire alarm system devices include any one of: a smoke detector, a fire detector, a carbon dioxide detector, an audible alarm device, or a user interaction device.

8. The fire alarm system monitoring mobile device of claim 6, wherein the different patterns represent a type of maintenance needed for the particular fire alarm system device, no maintenance is needed for the particular device, or an arrangement of the fire alarm system devices within the selected loop.

9. A fire alarm system monitoring mobile device, comprising:

a fire alarm system control application resident on the mobile device, wherein the fire alarm system control application allows for selection of a loop of fire alarm system devices to activate a test mode of the loop of fire alarm system devices, wherein the loop is a subsystem of interconnected fire alarm system devices;

a database accessible via the fire alarm system control application;

a search utility within the fire alarm system control application, such that the search utility searches the database to identify a particular fire alarm system device from the loop of fire alarm system devices; and a graphical user interface of the fire alarm system control application on the mobile device, wherein the graphical user interface includes:

a number of icons, each icon representing one of the fire alarm system devices within the selected loop;

a number of functional buttons to initiate a response on each of the selected fire alarm system devices of the loop; and information about a particular fire alarm system device among the loop of fire alarm system devices that a technician is being directed to as part of a test procedure carried out by the technician.

10. The fire alarm system monitoring device of claim 9, wherein the database includes loop information about a plurality of loops within a building, each loop having multiple fire alarm system devices, and wherein the loop information includes information indicating into which loop each of the fire alarm system devices is a member among the plurality of loops.

11. The fire alarm system monitoring device of claim 10, wherein the fire alarm system control application search utility includes an ability to search the database and return results based on the loop information.

12. The fire alarm system monitoring device of claim 9, wherein the number of icons presented on the graphical user interface include different patterns, such that each pattern represents a different type of fire alarm system device, and wherein the different types of fire alarm system devices are selected from types including: a smoke detector, a fire detector, a carbon dioxide detector, an audible alarm device, and a user interaction device.

13. The fire alarm system monitoring device of claim 9, wherein the number of icons include information identifying which fire alarm system devices are in a particular loop, which fire alarm system devices need attention, which fire alarm system devices do not need attention, a type of fire alarm device in the loop, or an arrangement of the fire alarm devices in the loop.

14. A fire alarm monitoring system, comprising:

a fire alarm system having a plurality of fire alarm system devices;

a mobile device that is in communication with the fire alarm system, the mobile device having a fire alarm system control application resident thereon, wherein the fire alarm system control application allows for selection of a loop of fire alarm system devices among the plurality of fire alarm system devices to activate a test mode of the loop of fire alarm system devices, and wherein the loop is a subsystem of interconnected fire alarm system devices;

a database accessible via the fire alarm system control application;

a search utility within the fire alarm system control application, such that the search utility searches the database to identify a particular fire alarm system device from the loop of fire alarm system devices; and a graphical user interface of the fire alarm system control application on the mobile device, wherein the graphical user interface includes:

a number of icons, each icon representing one of the fire alarm system devices within the selected loop;

a number of functional buttons to initiate a response on each of the selected fire alarm system devices of the loop; and information about a particular fire alarm system device among the loop of fire alarm system devices that a technician is being directed to as part of a test procedure carried out by the technician.

15. The fire alarm monitoring system of claim 14, wherein the fire alarm system control application issues a command to the identified particular fire alarm system device among the loop of fire alarm system devices to perform a particular function.

16. The fire alarm monitoring system of claim 15, further comprising a system control panel for controlling the fire alarm system devices connected to and controlled by the control panel, wherein the control panel is instructed to relay the command to the particular fire alarm system device.

17. The fire alarm monitoring system of claim 14, wherein the mobile device includes functionality to give the particular fire alarm system device a label at the particular fire alarm system device location.

18. The fire alarm monitoring system of claim 17, wherein the mobile device further includes functionality to update the given label of the particular fire alarm system device at the particular fire alarm system device location.

19. The fire alarm monitoring system of claim 14, wherein the mobile device includes functionality to allow the technician to command the fire alarm system devices in the selected loop with a specific label to activate at a same time, and wherein the activation event appears on the graphical user interface of the mobile device.

20. The fire alarm monitoring system of claim 14, wherein the graphical user interface provides functionality to change one or more fire alarm system device settings on the particular fire alarm system device.

* * * * *